US 9,708,981 B2

(12) United States Patent
Augros

(10) Patent No.: US 9,708,981 B2
(45) Date of Patent: Jul. 18, 2017

(54) METHOD AND DEVICE FOR SUPPLYING A LUBRICANT

(71) Applicant: SAFRAN HELICOPTER ENGINES, Bordes (FR)

(72) Inventor: Philippe Alain Francois Augros, Serres-Morlaas (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 15/233,990

(22) Filed: Aug. 11, 2016

(65) Prior Publication Data

US 2016/0348583 A1 Dec. 1, 2016

Related U.S. Application Data

(62) Division of application No. 13/980,696, filed as application No. PCT/FR2012/050057 on Jan. 10, 2012, now abandoned.

(30) Foreign Application Priority Data

Jan. 19, 2011 (FR) ...................... 11 50421

(51) Int. Cl.
*F02C 7/06* (2006.01)
*F01M 5/00* (2006.01)
(Continued)

(52) U.S. Cl.
CPC ................ *F02C 7/06* (2013.01); *F01D 25/10* (2013.01); *F01D 25/125* (2013.01); *F01D 25/18* (2013.01);
(Continued)

(58) Field of Classification Search
CPC .......... F02C 7/06; F01D 25/10; F01D 25/125; F01D 25/18; F01D 25/20; F01M 5/001; F01M 5/002; F16C 33/66
(Continued)

(56) References Cited

U.S. PATENT DOCUMENTS 4,020,632 A * 5/1977 Coffinberry ............... F02C 7/14
123/41.33
4,696,156 A * 9/1987 Burr ........................ F01D 25/18
60/39.08

(Continued)

FOREIGN PATENT DOCUMENTS

EP       0 248 762 A2    12/1987
EP       1 736 650       12/2006
(Continued)

OTHER PUBLICATIONS

International Search Report Issued May 3, 2012 in PCT/FR12/50057 Filed Jan. 10, 2012.
(Continued)

*Primary Examiner* — Michael Riegelman
(74) *Attorney, Agent, or Firm* — Oblon, McClelland, Maier & Neustadt, L.L.P.

(57) ABSTRACT

A device and method feeding turbomachines with lubricant, the turbomachine including a first set of bearings and a second set of bearings. Both the first and the second sets of bearings are fed with lubricant, and the second set of bearings operate at a temperature higher than the first set. The second set of bearings is fed with lubricant at a temperature higher than the first set.

9 Claims, 2 Drawing Sheets

(51) Int. Cl.
*F01D 25/20* (2006.01)
*F16C 33/66* (2006.01)
*F01D 25/10* (2006.01)
*F01D 25/12* (2006.01)
*F01D 25/18* (2006.01)

(52) U.S. Cl.
CPC ............ *F01D 25/20* (2013.01); *F01M 5/001* (2013.01); *F01M 5/002* (2013.01); *F16C 33/66* (2013.01); *F05D 2220/329* (2013.01); *F05D 2260/98* (2013.01)

(58) Field of Classification Search
USPC ........................................................ 184/6.11
See application file for complete search history.

(56) References Cited

U.S. PATENT DOCUMENTS

| | | | |
|---|---|---|---|
| 4,917,218 A | 4/1990 | Murray | |
| 5,318,151 A | 6/1994 | Hood | |
| 7,287,368 B2* | 10/2007 | Tumelty | F01D 25/20 184/6.11 |
| 8,110,106 B2 | 2/2012 | Allen | |
| 8,196,707 B2 | 6/2012 | Kardos | |
| 8,438,850 B2* | 5/2013 | Annigeri | F02C 7/224 60/39.08 |
| 8,869,940 B2* | 10/2014 | Johnson | F16N 7/40 184/6.12 |
| 8,899,009 B2* | 12/2014 | Francisco | F02C 6/08 60/39.094 |
| 2005/0034925 A1 | 2/2005 | Flamang | |
| 2007/0022732 A1 | 2/2007 | Holloway et al. | |
| 2009/0191060 A1 | 7/2009 | Bagepalli | |
| 2009/0200114 A1 | 8/2009 | Bagepalli | |
| 2010/0329869 A1 | 12/2010 | Okano | |
| 2011/0012353 A1 | 1/2011 | Kamata | |
| 2011/0217173 A1 | 9/2011 | Mallada | |
| 2012/0211307 A1 | 8/2012 | Nielsen | |
| 2012/0241258 A1 | 9/2012 | Subramaniam | |
| 2012/0243998 A1 | 9/2012 | Becker | |
| 2012/0256426 A1* | 10/2012 | Klein | F03D 80/70 290/1 C |
| 2013/0288843 A1* | 10/2013 | Baum | F01M 5/001 475/160 |
| 2014/0075916 A1* | 3/2014 | Augros | F01M 5/001 60/39.08 |

FOREIGN PATENT DOCUMENTS

| | | |
|---|---|---|
| GB | 2 086 996 | 5/1982 |
| JP | 58 183822 | 10/1983 |
| JP | 62-298626 A | 12/1987 |
| JP | 2007-327359 A | 12/2007 |
| JP | 2008-255825 A | 10/2008 |

OTHER PUBLICATIONS

Office Action issued on Oct. 6, 2015 in the corresponding Japanese Patent Application No. 2013-549864 (English Translation only).

* cited by examiner

METHOD AND DEVICE FOR SUPPLYING A LUBRICANT

CROSS-REFERENCE TO RELATED APPLICATIONS

The present application is a divisional of U.S. application Ser. No. 13/980,696, filed Nov. 25, 2013, which is a National Stage Application of International Application No. PCT/FR12/50057, filed Jan. 10, 2012, and which claims the benefit of foreign priority to French Application No. 11 50421, filed Jan. 19, 2011, the entire contents of each of which are incorporated herein by reference.

The present specification relates to the field of methods, systems, and devices for feeding lubricant, in particular to turbomachines.

In many turbomachines, and in particular turboshaft engines, turbojets, turboprops, turbopumps, or turbocompressors, it is possible to distinguish between two zones at temperatures that are clearly different. Thus, in turboshaft engines, turbojets, and turboprops for aviation purposes, it is normally possible to distinguish between a relatively cool zone having a compressor and a relatively hot zone having the combustion chamber and the turbine. Such turbomachines also normally include bearings, both in the low temperature zone and in the high temperature zone for the purpose of supporting rotary parts, and in particular the drive shaft. Thus, in a single turbomachine, a first set of bearings operates at a relatively low temperature while a second set of bearings operates at a relatively high temperature. As used herein, the term "set of bearings" does not necessarily have a plurality of bearings, but could optionally equally well comprise a set with only one unit.

Conventionally, a common feed circuit is used for feeding lubricant to both the first and the second sets of bearings. In order to remove the heat transmitted to the lubricant by the bearings, and thus maintain the temperature of the lubricant while the turbomachine is in operation, the feed circuit normally includes a heat exchanger, and the lubricant is fed to the bearings after being cooled in the heat exchanger, which may for example be an air/lubricant heat exchanger or a fuel/lubricant heat exchanger, thus dumping heat from the lubricant respectively to ambient air or to a fuel circuit.

Such a heat exchanger is a part that is comparatively complex, heavy, and bulky. Unfortunately, in particular in aviation applications, it is desirable to minimize those drawbacks, and in particular to minimize weight.

Consequently, the invention seeks to provide a method of feeding a turbomachine with lubricant that makes it possible to reduce the cooling requirements of the lubricant, and also the weight, the volume, and the complexity of the heat exchanger(s) associated therewith.

In at least a first implementation, this object is achieved by the fact that, in a turbomachine having a first set of bearings and a second set of bearings operating at a temperature substantially higher than the first set, the second set of bearings is fed with lubricant at a temperature that is substantially higher than the first set.

By means of these provisions, it is possible to reduce the temperature difference between the bearings of the second set and the lubricant that is delivered thereto. Since the transfer of heat from the second set to the lubricant depends on this temperature difference, this transfer is likewise substantially reduced, and in this way the overall requirements for cooling the lubricant are reduced.

In certain implementations, a flow of lubricant is cooled in a heat exchanger upstream from the first set of bearings. Thus, at least some of the heat absorbed by the lubricant can be removed in order to stabilize its temperature without necessarily cooling the flow of lubricant to the second set of bearings.

In certain implementations, a lubricant flow is heated upstream from the second set of bearings, this heating being obtained by exchanging heat with a flow of lubricant returning from the second set of bearings. It is thus possible to increase the temperature of the lubricant delivered to the second set of bearings, while cooling the lubricant recovered from the second set of bearings, thereby contributing to reducing the overall transfer of heat from the second set of bearings to the lubricant.

In certain implementations, the first set of bearings is fed with lubricant by a first circuit, and the second set of bearings is fed with lubricant by a second circuit branching from the first circuit, thus making it possible to treat the lubricant for each of the sets of bearings in different manners, and in particular specifically to cool the lubricant delivered to the first set by the first circuit, and/or specifically to heat the lubricant delivered to the second set, e.g. by exchanging heat with a flow of lubricant returning from the second set.

The present specification also relates to a device for feeding a turbomachine with lubricant, said turbomachine having a first set of bearings and a second set of bearings, and said second set being suitable for operating at a temperature that is substantially higher than said first set.

In at least one embodiment, the device is configured to feed the second set with lubricant at a temperature that is substantially higher than the first set. Thus, the transfer of heat between the hotter second set of bearings and the lubricant can be decreased, thereby reducing the overall needs for cooling the lubricant.

In certain embodiments, the device has a first circuit for feeding lubricant to the first set of bearings, and a second circuit for feeding lubricant to the second set of bearings, the first circuit having a branch point leading to the second circuit. It is thus possible at this branch point to separate two distinct flows of lubricant, a first flow being delivered to the first set of bearings by the first circuit and a hotter second flow being delivered to the second set by the second circuit. In particular, the first circuit may include a heat exchanger between said branch point and the first set of bearings in order to cool the lubricant for feeding the first set of bearings so as to cool the lubricant for feeding to the first set of bearings separately without affecting the temperature of the lubricant for feeding to the hotter second set of bearings. The second circuit may also include a heat exchanger for transferring heat from a flow of lubricant returning from the second set of bearings to a flow of lubricant for feeding to the second set of bearings, thereby increasing the temperature of the lubricant delivered to the second set of bearings while reducing the temperature of the lubricant returned from the second set of bearings.

Nevertheless, in certain embodiments, other configurations of circuits and heat exchangers may be considered. For example, the second circuit could be entirely separate from the first circuit and not branched therefrom. The heat exchangers of the first and second circuits could also be incorporated in the device independently from each other. It is even possible to envisage incorporating a heat exchanger for cooling the lubricant upstream from the branch point between the first and second circuits so as to cool at least a portion of the flow of lubricant for the second set of bearings.

The present specification also relates to a turbomachine having a first set of bearings, a second set of bearings suitable for operating at a temperature that is substantially higher than the first set, and a device configured to feed the second set with lubricant at a temperature that is substantially higher than the first set, and also a turbine engine assembly including such an engine, in particular for aviation purposes. The term "turbine engine assembly" is used not only for a turboshaft engine, but for a turboprop or a turbojet, with or without a bypass.

By means of these arrangements, it is possible to reduce the weight, the size, the cost, and the complexity of such a turbomachine and of such a turbine engine assembly.

The invention can be well understood and its advantages appear better on reading the following detailed description of embodiments given as non-limiting examples. The description refers to the accompanying drawings, in which.

Figure 3A:
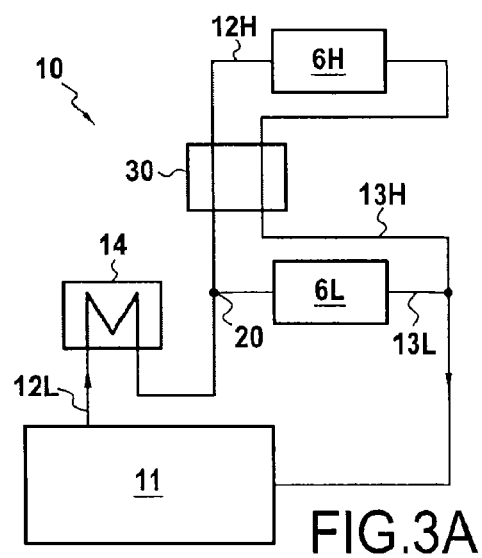
Figure 3B:
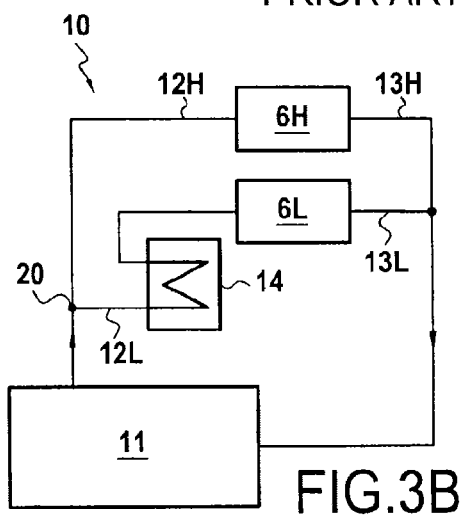
Figure 3C:
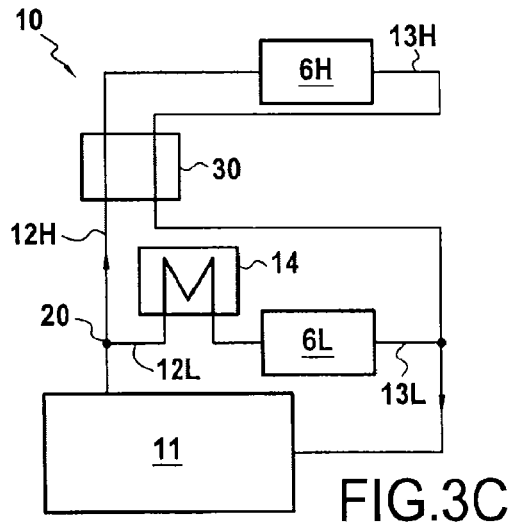
Figure 3D:
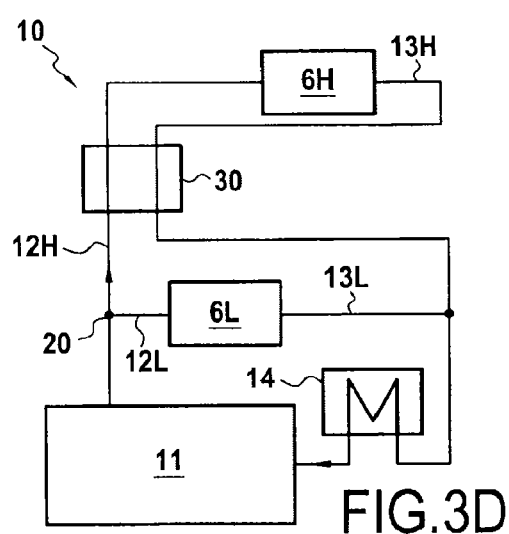
Figure 4:
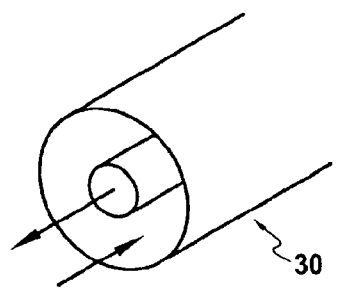

FIGS. 3A, 3B, 3C, and 3D are diagrams showing lubricant feed devices respectively constituting first, second, third, and fourth embodiments; and FIG. 4 is a diagram of a regenerative heat exchanger.

Figure 1:
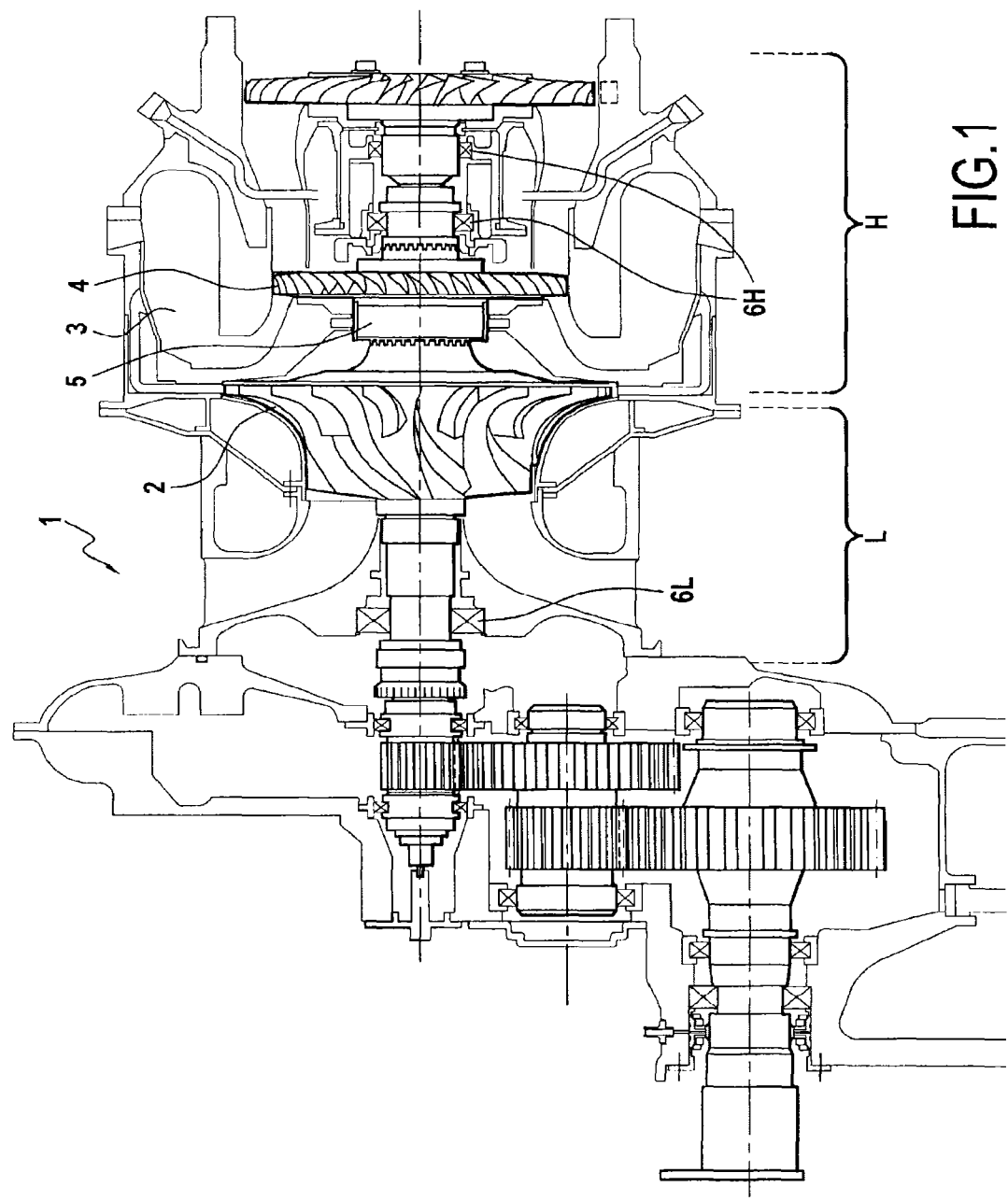
FIG. 1 is a longitudinal section of a turbomachine.

A turbomachine 1, more specifically forming part of a turboshaft engine assembly of a rotary wing aircraft is shown by way of illustration in FIG. 1. The turbomachine 1 comprises a low temperature section L including the compressor 2, and a high temperature section H including the combustion chamber 3 and the turbine 4. The turbine 4 and the compressor 2 are connected together by the drive shaft 5, which is supported by a plurality of bearings comprising a first set of bearings 6L in the low temperature section L and a second set of bearings 6H in the high temperature section H. Given their position, the bearings 6H in the high temperature section H are at a temperature that is significantly higher than the temperature of the bearings 6L in the low temperature section L.

Figure 2:
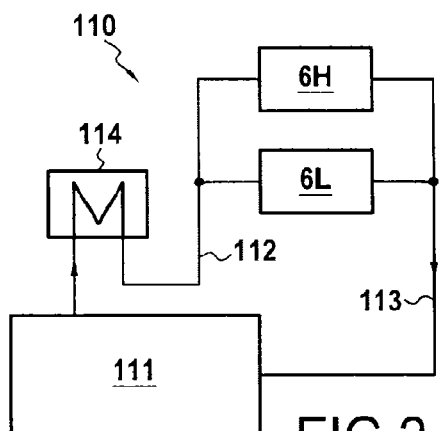
FIG. 2 is a diagram of a prior art lubricant feed device.

In order to lubricate the bearings 6L and 6H, such an engine normally also includes a device for feeding the bearings with lubricant. One such prior art device is shown in FIG. 2. That lubricant feed device 110 comprises a tank 111 and a common lubricant circuit 112 for feeding the bearings 6L of the low temperature section and the bearings 6H of the high temperature section H, together with a circuit 113 for returning lubricant from the bearings 6L and 6H to the tank 111. Both the lubricant feed circuit 112 and the lubricant return circuit 113 may include conventional control and/or monitoring means (not shown) for circulating the lubricant and monitoring the pressure, the temperature, the presence of particles, etc. in the circuits 112 and 113, such as pumps, valves, check valves, and/or filters. In addition, the feed circuit 112 has a heat exchanger 114 for cooling the lubricant and removing the heat absorbed in the bearings 6L and 6H. By way of example, the heat exchanger 114 may be a lubricant/air heat exchanger for dumping the heat of the lubricant to ambient air, a lubricant/fuel heat exchanger for dumping the heat from the lubricant to a fuel circuit of the engine, or a combination of both.

With that prior art lubricant feed device 110, the lubricant is thus delivered to the bearings 6L and 6H at substantially the same temperature. Nevertheless, since the bearings 6H in the high temperature section H are at a temperature that is significantly higher than the bearings 6L in the low temperature section L, the lubricant will be heated more intensely in the bearings 6H than in the bearings 6L.

Thus, with an overall lubricant flow rate $D_g$ equal to 450 liters per hour (L/h), for example, shared between a flow rate $D_L$ of 300 L/h, for example, and a flow rate $D_H$ of 150 L/h, for example, respectively for the bearings 6L and 6H, and delivered to both sets of bearings at a common temperature $T_i$ of 111° C., for example, the flow $D_L$ receives heat power $P_L$ from the bearings 6L, e.g. of 1.7 kilowatts (kW), thereby heating up to a temperature $T_{o,L}$ equal to 121° C., for example, whereas the flow $D_H$ receives heat power $P_H$ from the bearings 6H, e.g. of 4.9 kW, and is heated up to a temperature $T_{o,H}$, e.g. of 171° C. The two partial flows $D_L$ and $D_H$ mix together again in the tank 111 where the lubricant thus prevents an intermediate temperature $T_R$, e.g. of 138° C. In order to cool the overall flow $D_g$ down to the initial temperature $T_i$, the heat exchanger 114 must therefore remove a heat power $P_T$ that is approximately equivalent to summing the heat powers $P_L$ and $P_H$, i.e. 6.6 kW for the values given above by way of example. In order to remove the heat flux that is transferred to the lubricant in particular by the bearings 6H, and thus avoid overheating and potential coking and/or accelerated aging of the oil, the heat exchanger 114 needs to be of dimensions that are considerable.

FIG. 3A shows a first embodiment of a lubricant feed device 10 enabling lubricant cooling requirements to be reduced compared with the prior art. This lubricant feed device 10 has a tank 11, a first feed circuit 12L for feeding lubricant to the set of bearings 6L in the low temperature section L, a second feed circuit 12H for feeding lubricant to the set of bearings 6H in the high temperature section H, a first return circuit 13L for returning lubricant from the set of bearings 6L to the tank 11, and a second return circuit 13H for returning lubricant from the set of bearings 6H to the tank 11. The second feed circuit 12H branches from the first feed circuit 12L at a branch point 20. As in the prior art, each circuit 12H, 12L, 13H, and 13L may be fitted with conventional means (not shown) for driving and controlling lubricant circulation via the circuits 12H, 12L, 13H, and 13L, such as pumps, valves, check valves, and/or filters.

In this first embodiment, the first feed circuit 12L includes a heat exchanger 14 upstream from the branch point 20 for the purpose of cooling the lubricant that is to be delivered to both sets of bearings 6H and 6L. By way of example, this heat exchanger 14 may be a lubricant/air heat exchanger in order to dump heat from the lubricant to ambient air, a lubricant/fuel heat exchanger in order to dump heat from the lubricant to a fuel circuit of the engine, or a combination of both.

Another the exchanger 30 is interposed between the feed circuit 12H and the return circuit 13H in order to heat the lubricant that is to feed the bearings 6H, using heat taken from the lubricant returning from the bearings 6H. Such a regenerative heat exchanger 30 may be made in particularly simple manner by coaxial ducts 31 and 32 serving respectively in the go and the return directions of the lubricant, as shown in FIG. 4.

With the device 10, the bearings 6H of the high temperature section H of the engine 1 and the bearings 6L of the low temperature section L can be fed with lubricant at temperatures that are substantially different. More specifically, the lubricant delivered by the circuit 12H to the bearings 6H is substantially hotter than the lubricant delivered by the circuit 12L to the bearings 6L. Consequently, the temperature difference between the bearings 6H and the lubricant that is delivered thereto in operation by the circuit 12H is less than in the prior art device 110, thereby reducing the transfer of heat from the bearings 6H to the lubricant, and thus reducing the overall requirements for cooling the lubricant. The heat exchanger 14 may thus be dimensioned to be smaller than the heat exchanger 114 of the prior art device 110.

In an engine equivalent to the engine having the device 110 described above for comparative purposes, the set of bearings 6L of the low temperature section L and the set of bearings 6H of the high temperature section H thus receive respective flow rates $D_L$ and $D_H$ of lubricant equal to 300 L/h and 150 L/h, respectively. The heat power $P_T$ to be removed by the heat exchanger 14 can nevertheless be reduced, e.g. to 5.8 kW, thus representing a reduction of 12% compared with the heat exchanger 114 of the prior art device 110. With the same temperature $T_R$ for the lubricant in the tank 11 (138° C. in this example), the overall flow rate $D_g$ is cooled in the heat exchanger 14 only down to a temperature $T_{i,L}$ that is higher than the temperature $T_i$ of the comparative device 110, e.g. to a temperature $T_{i,L}$ of 115° C. The flow $D_L$ delivered to the bearings 6L is at this temperature $T_{i,L}$ and on receiving in the bearings 6L a heat power $P_L$ that may likewise be 1.7 kW of heat from the bearings 6L, is returned to the tank 11 at a temperature $T_{o,L}$ that is higher than in the comparative example of the prior art, e.g. a temperature $T_{o,L}$ of 125° C.

However, the flow $D_H$ delivered to the bearings 6H is heated in the heat exchanger 30 by lubricant returning from those bearings 6H up to a temperature $T_{i,H}$ that is higher than the temperature $T_{i,L}$. For example, the temperature $T_{i,H}$ may be 135° C. On being delivered at this higher temperature $T_{i,H}$ to the bearings 6H, the flow $D_H$ will absorb perceptibly less heat power $P_L$ because of the smaller temperature difference. With the values given by way of example, this heat power $P_L$ may be no more than 4.1 kW. Nevertheless, on leaving the bearings 6H, the lubricant will also reach a temperature $T_{o,H}$ that is higher than in the comparative example of the prior art. In this embodiment, the temperature $T_{o,H}$ may be 185° C., for example. Nevertheless, since a fraction of the heat from the lubricant returning from the bearings 6H is then transferred to the lubricant arriving in the heat exchanger 30, the temperature $T_{r,H}$ of this flow $D_H$ on returning to the tank can be lower than the temperature $T_{o,H}$ of the comparative example of the prior art. For example, the temperature $T_{r,H}$ may be 165° C.

Since the lubricant thus reaches higher temperatures in the bearings 6H in order to reduce the amount of heat power that is absorbed, the main limiting factor at present for reducing the heat power that is absorbed is the maximum temperature that may be reached by the lubricant. Since aviation lubricant typically has a coking temperature lying in a range of 180° C. to 210° C., the temperature $T_o$m should normally lie in this range, immediately below the coking temperature of the lubricant used. Apart from the risk of the lubricant coking, the other limiting factor on the maximum temperature of the lubricant in the bearings 6H is the highest temperature the bearings 6H can themselves withstand, given that these bearings may be made out of materials that are particularly good at withstanding high temperatures, such as for example low-carbon steels such as M50 and M50NiL steels, nitrided steels such as 32 CDV 13 steel as defined by French aviation standard AIR 9160, or ceramics.

FIG. 3B shows an alternative embodiment that does not have the heat exchanger 30 upstream and downstream from the bearings 6H, but in which the heat exchanger 14 is placed in the circuit 12L downstream from the branch point 20. In this second embodiment, the heat exchanger 14 therefore cools only the flow of lubricant delivered to the bearings 6L. Thus, even without the additional heat exchanger of the first embodiment, the lubricant delivered to the bearings 6H is hotter than the lubricant delivered to the bearings 6L, since it is only that lubricant which is cooled by the heat exchanger 14. The cooling requirements for the lubricant are therefore more moderate.

In an engine equivalent to the engine used with the device 110 described above by way of comparison, the set of bearings 6L of the low temperature section L and the set of bearings 6H of the high temperature section H thus receive respective flow rates $D_L$ and $D_H$ that may likewise be 300 L/h and 150 L/h for example. The heat power $P_T$ to be removed by the heat exchanger 14 can thus likewise be reduced, e.g. to 5.5 kW, thus presenting a reduction of 16% compared with the heat exchanger 114 of the prior art device 110. With the same temperature $T_R$ for the lubricant in the tank 11 (138° C. in this example), the heat exchanger 14 cooling only the flow $D_L$, even when removing less heat, can nevertheless cause the temperature $T_{i,L}$ to drop below the prior art description $T_i$, e.g. down to 104° C. With substantially the same heat power PL absorbed in the bearings 6L, this lubricant flow $D_L$ returns to the tank 11 at a temperature $T_{o,L}$, that is substantially lower than the prior art temperature. For example, the temperature $T_{o,L}$ of the flow $D_L$ returning to the tank 11 in this embodiment may be 114° C.

Furthermore, even with small heat losses in the circuit 12H, the flow of lubricant $D_H$ is delivered to the bearings 6H at a temperature $T_{i,H}$ that is hardly any lower than the temperature $T_R$ of the lubricant in the tank 11, and that is thus substantially higher than the temperature $T_{i,L}$. For example, the temperature $T_{i,H}$ in this embodiment may be 135° C. Even with a temperature $T_{o,H}$ that is significantly higher at the outlet from the bearings 6H, e.g. a temperature of 185° C., the flow $D_H$ will therefore absorb only a relatively limited amount of heat power $P_L$ from the bearings 6H. Thus, with the values given by way of example, the power $P_L$ is limited to 4.2 kW.

FIG. 3C shows a third embodiment combining the characteristics of the first and second embodiments. Thus, the heat exchanger 14 is situated downstream from the branch point 20, as in the second embodiment, but the device 10 also includes a heat exchanger 30 interposed between the feed circuit 12H and the return circuit 13H, as in the first embodiment. It therefore serves to cool both the lubricant going to the bearings 6L and the lubricant going to the bearings 6H. This third embodiment is more advantageous for devices that present a larger ratio between the flow rate of oil delivered to the bearings 6H and the flow rate of oil delivered to the bearings 6L.

Finally, FIG. 3D shows a fourth embodiment similar to the first embodiment, but with the heat exchanger 14 being situated between the first and second return circuits 13L and 13H and the tank 11. The lubricant is thus cooled upstream rather than downstream of the tank, which, depending on the thermal characteristics of the tank 11, on its capacity, and on the flow rate of the circulating lubricant, may be more or less effective than the arrangement of the first embodiment.

Although the present invention is described with reference to specific embodiments, it is clear that various modifications and changes may be performed on those embodiments without going beyond the general scope of the invention as defined by the claims. In particular, the individual characteristics of the various embodiments shown may be combined in additional embodiments. Consequently, the description and the drawings should be considered as being illustrated rather than restrictive.

The invention claimed is:

1. A lubricant feed method for feeding a turbomachine with lubricant, said turbomachine having at least a first set of bearings and a second set of bearings, both the first and the second set being fed with lubricant, and the second set of bearings operating at a bearing temperature that is higher than a bearing temperature of the first set, the method comprising a step of heating a lubricant flow upstream from the second set of bearings by exchanging heat with a flow of lubricant returning from the second set of bearings, so that the second set of bearings is fed with lubricant at a lubricant temperature that is higher than a lubricant temperature of lubricant fed to the first set of bearings.

2. The lubricant feed method according to claim 1, further comprising a step of cooling a flow of lubricant in a heat exchanger upstream from the first set of bearings.

3. The lubricant feed method according to claim 1, wherein the first set of bearings is fed with lubricant by a first circuit, and the second set of bearings is fed with lubricant by a second circuit branching from the first circuit.

4. A lubricant feed device for feeding a turbomachine with lubricant, said turbomachine comprising a first set of bearings and a second set of bearings, and said second set operating at a bearing temperature that is higher than a bearing temperature of said first set, the lubricant feed device comprising a first circuit for feeding lubricant to the first set of bearings, and a second circuit for feeding lubricant to the second set of bearings, the first circuit having a branch point leading to the second circuit, and the second circuit having a heat exchanger for transmitting heat from at least a flow of lubricant returning from the second set of bearings to a flow of lubricant for feeding the second set of bearings, so as to feed the second set of bearings with lubricant at a lubricant temperature that is higher than a lubricant temperature of lubricant fed to the first set of bearings.

5. The lubricant feed device according to claim 4, wherein the first circuit includes a heat exchanger between said branch point and the first set of bearings in order to cool a flow of lubricant for the first set of bearings.

6. A turbomachine comprising a first set of bearings, a second set of bearings operating at a temperature higher than the first set of bearings, and a lubricant feed device comprising a first circuit for feeding lubricant to the first set of bearings, and a second circuit for feeding lubricant to the second set of bearings, the first circuit having a branch point leading to the second circuit, and the second circuit having a heat exchanger for transmitting heat from at least a flow of lubricant returning from the second set of bearings to a flow of lubricant for feeding the second set of bearings, so as to feed the second set of bearings with lubricant at a lubricant temperature that is higher than a lubricant temperature of lubricant fed to the first set of bearings.

7. The turbomachine according to claim 6, wherein the first circuit includes a heat exchanger between said branch point and the first set of bearings in order to cool a flow of lubricant for the first set of bearings.

8. A turbine engine assembly, or a turbine engine assembly for aviation purposes, including a turbomachine comprising a first set of bearings, a second set of bearings operating at a temperature higher than the first set of bearings, and a lubricant feed device comprising a first circuit for feeding lubricant to the first set of bearings, and a second circuit for feeding lubricant to the second set of bearings, the first circuit having a branch point leading to the second circuit, and the second circuit having a heat exchanger for transmitting heat from at least a flow of lubricant returning from the second set of bearings to a flow of lubricant for feeding the second set of bearings, so as to feed the second set of bearings with lubricant at a lubricant temperature that is higher than a lubricant temperature of lubricant fed to the first set of bearings.

9. The turbine engine assembly according to claim 8, wherein the first circuit includes a heat exchanger between said branch point and the first set of bearings in order to cool a flow of lubricant for the first set of bearings.

* * * * *